(12) United States Patent
Swensen et al.

(10) Patent No.: US 8,936,249 B2
(45) Date of Patent: Jan. 20, 2015

(54) RESILIENT SEAL HAVING A PRESSURIZED BELLOWS SPRING

(75) Inventors: Jeffrey E. Swensen, Eldersburg, MD (US); Matthew E. Roach, Catonsville, MD (US)

(73) Assignee: Eaton Corporation, Cleveland, OH (US)

( * ) Notice: Subject to any disclaimer, the term of this patent is extended or adjusted under 35 U.S.C. 154(b) by 76 days.

(21) Appl. No.: 13/410,327

(22) Filed: Mar. 2, 2012

(65) Prior Publication Data

US 2013/0228980 A1    Sep. 5, 2013

(51) Int. Cl.
F16J 15/46    (2006.01)

(52) U.S. Cl.
USPC ............. 277/646; 277/644; 277/645

(58) Field of Classification Search
USPC ................. 277/605, 644–646, 634
See application file for complete search history.

(56) References Cited

U.S. PATENT DOCUMENTS

| | | | | |
|---|---|---|---|---|
| 1,875,148 | A * | 8/1932 | Reid | 277/645 |
| 3,161,229 | A * | 12/1964 | Sanders | 160/40 |
| 3,308,727 | A * | 3/1967 | Hurt, Jr. | 49/479.1 |
| 4,676,531 | A * | 6/1987 | Martin | 285/96 |
| 4,744,572 | A * | 5/1988 | Sahba et al. | 277/641 |
| 5,102,150 | A | 4/1992 | Kahn | |
| 5,240,263 | A * | 8/1993 | Nicholson | 277/614 |
| 5,317,952 | A | 6/1994 | Immega | |
| 7,740,080 | B2 * | 6/2010 | Fenton | 166/387 |
| 2002/0074740 | A1 * | 6/2002 | Quoiani | 277/604 |
| 2002/0113379 | A1 * | 8/2002 | Giebel | 277/646 |
| 2005/0076642 | A1 | 4/2005 | Reichert | |

FOREIGN PATENT DOCUMENTS

GB        2166496 A        5/1986

OTHER PUBLICATIONS

International Search Report for PCT/US2013/028158, dated Jun. 12, 2013.

* cited by examiner

*Primary Examiner* — Vishal Patel
*Assistant Examiner* — Stacy Warren
(74) *Attorney, Agent, or Firm* — Rader, Fishman & Grauer PLLC

(57) ABSTRACT

An increased resilience seal utilizing a sealed gas filled inner chamber in a bellows spring that functions as both a mechanical spring and a gas spring to provide a more constant level of separation force between two face plates to provide a seal between two mechanical components such as those found in an aircraft jet engine. The bellows spring is made of a plurality of walls that are joined together in a pressurized chamber that is filled with a gas, such as an inert gas. In alternative embodiments, the bellows spring is made of walls that are shaped and oriented to optimize the operating characteristics of the bellows spring when the pressure is increased in a sealed inner chamber in response to elevated temperature. In one embodiment, the walls forming a portion of the chamber overlap to optimize the geometry of the bellows spring.

16 Claims, 6 Drawing Sheets

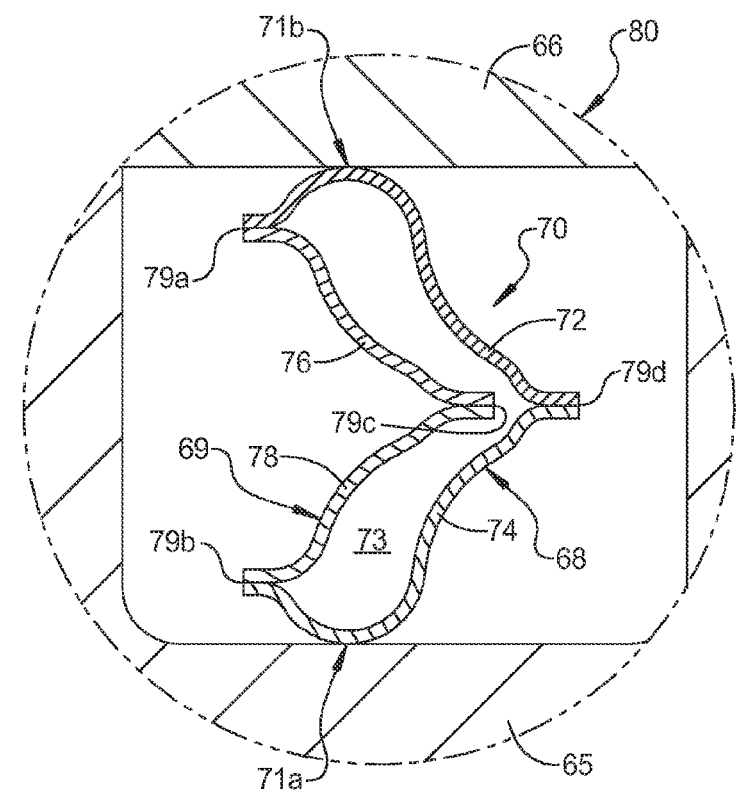
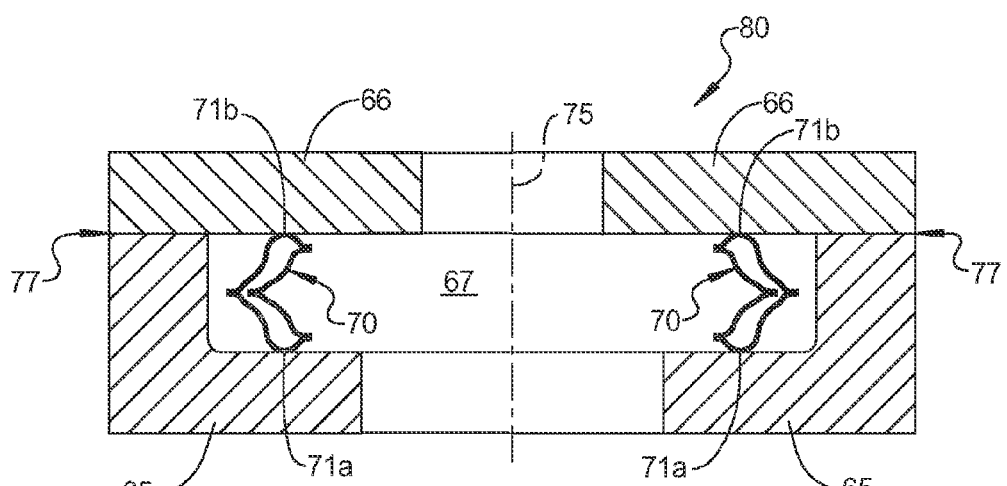

RESILIENT SEAL HAVING A PRESSURIZED BELLOWS SPRING

TECHNICAL FIELD

What is disclosed is a resilient seal for use in high temperature applications such as a jet turbine engine and more specifically, a resilient metallic axial face seal for use in semi-static high temperature applications such as between components in a jet turbine engine, which generates a mechanical spring force and a gas spring force to supplement the mechanical spring force to create a sealing contact force between the seal and face plates.

PRIOR ART

In the prior art, the housing face plates of an axial face seal assembly are separated and sealed by a formed metallic spring. The quality of the seal depends on the physical properties of the spring to provide a separation force between engine components, such as face plates to try to ensure that a gas seal is created to seal a separation gap between the engine components. This type of seal is commonly used in gas turbine engines to provide a gas seal between certain components, such as engine core sections or engine housings. These engine sections experience very high operating temperatures which affect the operational characteristics of metallic components including the axial face seals due to the effect of very high temperatures on the metallurgy of the seal components. The resilience of the seal, or ability of the seal to track the movements of the components to be sealed, is critical to maintaining sealing contact between said components over a range of temperature induced movements. If the seal breaks contact with the component surfaces, leakage can occur. Additionally, a gap can prevent external pressure energization of the seal if so designed, and can allow airflow induced flutter of the seal leading to high cycle fatigue of the seal.

As performance expectations for gas turbine engines increase, sealing requirements increase as well while engine internal operating conditions become more severe. In the prior art, resilient metallic axial face seals rely primarily upon the mechanical properties of the material of the metallic spring to provide the separation force that seals between the face plates. It would be desirable to have a new type of axial face seal to mitigate both over-stress conditions and stress relaxation during service that would compromise the resilience of the seal and thereby compromise the ability of the seal to track displacements of the seal face plates caused by engine operation. Typically used Nickel-Chromium alloys maintain useful mechanical properties over a wide range of engine operating conditions, but become less suitable for resilient metallic seals above 1200 degrees F. Various alloys with improved stress relaxation or oxidation resistance properties have been employed in certain applications; however, these alloys typically lack the mechanical properties to ensure the sealing functionality expected.

SUMMARY

The exemplary resilient seal and seal assembly uses a bellows spring that includes a sealed internal chamber having a volume that is filled with a gas, such as an inert gas, which generates an increasing seal force with increasing temperature to ensure that the seal assembly tracks the cavity surfaces, or face plates, as they move, preventing a gap from forming. The bellows spring is formed by a plurality of specially designed walls that are welded together in a chamber pressurized with a gas, such as an inert gas. This trapped gas provides the increasing spring force at higher temperatures to offset the losses in the mechanical spring or to allow the mechanical spring to be designed for a lower stress state at the position where the assembly spends the majority of time.

In the assembly stage, the individual components of the sealed bellows spring are welded together inside of a container of gas at a pressure optimized for the sealing application of the seal. In an embodiment of the invention, the internal chamber of the bellows spring is filled with an inert gas, where the pressure of the gas increases with temperature following approximately, the perfect gas law of $PV=nRT$. A key advantage of the present seal design is the decoupling of the sealing force generated by the seal from the mechanical properties of the material used to construct the bellows spring to provide resilience at temperatures above the capabilities of most alloys commonly used for metallic seals. Variations of the design can take advantage of a combination of mechanical properties, operating pressure-energization and the gas spring effect of the bellows spring to provide the requisite sealing force between the bellows spring and the seal cavity surfaces such as face plates. Further possible variations include the use of alloys with extreme oxidation resistance, pressure balancing the engine operating pressure across the seal walls and variations in material thicknesses from one bellows spring component piece to the next to optimize the performance of the axial face seal assembly. Additionally, it is possible to design the seal assembly such that at operating temperature, in a closing cavity application, that the bending stress in the seal bellows plates is at a very low level to minimize stress relaxation.

Various bellows spring constructions are shown in the present disclosure and can be used to provide various operating characteristics depending on the application. Variations in the metallurgical properties of the material used in construction of the bellows spring, the thickness of the individual components used for the bellows spring and the structure of the bellows spring all contribute to the operating characteristics of the axial face seal assembly when used in an application such as in a gas turbine engine. The walls of the bellows spring can be contoured to minimize internal stress yet still operate to generate the desired mechanical and gas spring rates. In this manner, the seal force generated by the bellows spring is much more suitable for use in axial face seals that experience a wide range of operational temperatures and associated cavity movements.

The disclosed axial face seal concept could also be applied in alternative sealing configurations and orientations within a jet turbine engine or in other applications to produce similar sealing performance gains while, in some cases, also facilitating assembly during manufacture or maintenance. One of these other applications would include radial seal configurations where the increased internal pressure within the chamber volume of the bellows could be used to shift points of contact or seal orientation. Using the disclosed seal technology, sealing loads from the as installed condition could be changed with changes in operating temperature.

BRIEF DESCRIPTION OF THE DRAWINGS

FIG. 3 is a partial cross-sectional view of one side of a first alternative embodiment of an axial face seal assembly;

FIG. 4 is a cross-sectional view of the axial face seal assembly of FIG. 3;

DETAILED DESCRIPTION

Figure 1:
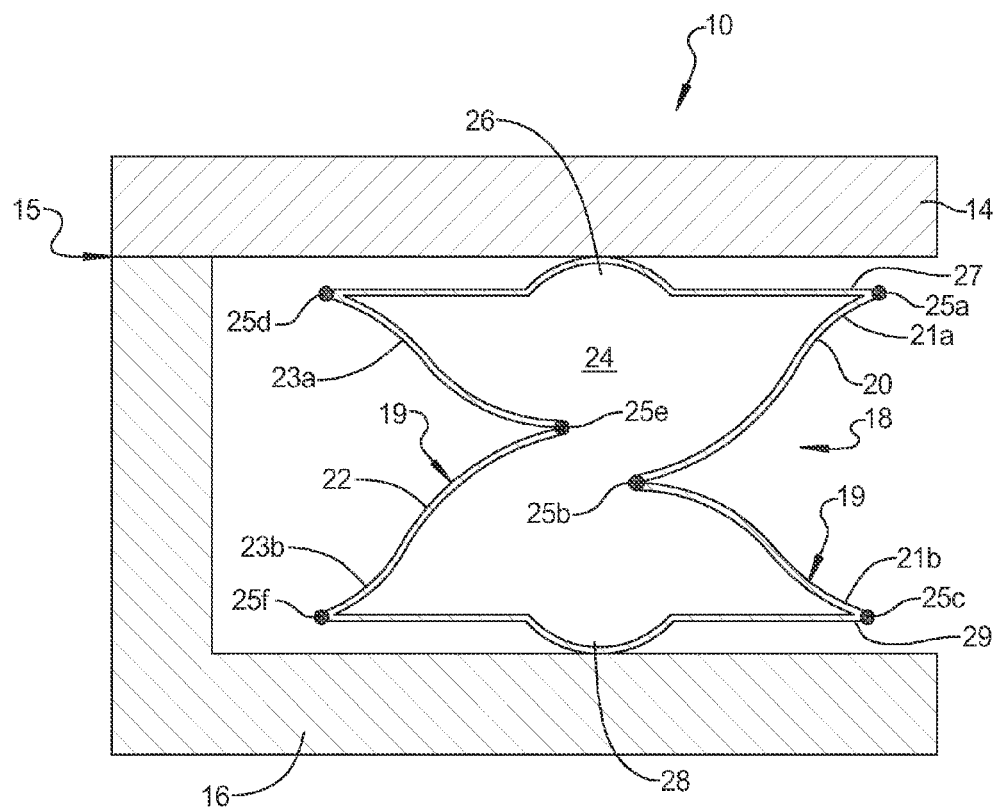
FIG. 1 is a partial cross-sectional view of one side of an axial face seal assembly according to an embodiment of the invention, including a pressurized bellows spring installed between two face plates.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

In this disclosure, certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the referenced structure. The terms "upward" and "downward" will refer to directions as taken in the drawings in connection with which the terminology is used. All foregoing terms mentioned above include the normal derivatives and equivalents thereof.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

While the invention will be described in connection with certain preferred embodiments, it will be understood that there is no intention to limit the invention to the constructions shown. On the contrary, it is intended to cover the various alternative and equivalent constructions included within the spirit and scope of the appended claims.

Now referring to FIG. 1 of the drawings, a cross-sectional view of one side of an axial face seal assembly 10 is shown. In the illustrated embodiment, the axial face seal assembly 10 includes a seal 18 including a bellows spring 19 having a plurality of walls that define a chamber 24 having a volume containing a pressurized gas. The bellows spring 19 comprises a mechanical spring and the pressurized gas comprises a gas spring. As shown in FIG. 1, the face seal assembly 10 uses the seal 18 to provide a gas seal between housing face plates 14 and 16 which can be considered as engine components. The gas sealing function depends primarily or at least in part on the separation force generated within the axial face seal assembly 10 by the seal 18. The first and second face plates 14 and 16 have a slight gap 15 between them that widens and closes with changes in operational temperature according to the relative movement between the first face plate 14 and the second face plate 16. Without the seal 18, this gap 15 would allow high temperature pressurized gases to escape through the gap 15 into the external area. However, the seal 18 prevents the escape of these gases by supplying a sealing force that is generated by the mechanical spring component in conjunction with a gas spring component of the seal 18. Due to this separation seal force, the seal 18 contacts and seals against both the face plates 14, 16. Thus, seal 18 is used to apply a sealing force between the first and second face plates 14, 16 that is the sum of a mechanical spring force and a gas spring force. The internal pressure of the gas in an internal chamber volume 24 in the bellows spring 18 increases in amplitude according approximately to the perfect gas law PV=nRT, thereby increasing the gas spring force of the seal 18 at increasing temperatures.

The level of this separation force determines the sealing capability of the seal between the first and second face plates 14, 16. While the gas spring component increases at high temperatures, such as above approximately 1200 degrees F., the mechanical spring component may decrease over time at high temperature due to changes in the material qualities of the bellows 18 at these elevated temperatures. It is desirable to maintain the total spring force relatively constant over time to maintain the sealing function of the axial face seal assembly 10 at various relative gaps between the face plates. This operational characteristic is largely achieved with the exemplary axial face seal assembly 10 since the total sealing force generated by the seal 18 at a target operating condition is decoupled from the physical properties of the mechanical spring. The target operating condition may be a discrete or threshold operating condition or a range of operating conditions, such as a discrete or threshold operating temperature or a range of operating temperatures, at which the seal functions for a specified period of time. For example, in an embodiment of the invention, the required total spring force generated by the seal 18 is achieved at a target operating condition of at least 1200 degrees F. over a specified turbine engine operating period.

To form the bellows spring 19, an upper plate 27 is connected to the bellows outside and inside sides 20, 22 where the bellows sides 20, 22 are in turn connected to the lower plate 29 to form a sealed gas chamber 24, which is filled with pressurized gas, such as Argon or some other inert gas. The bellows outside side 20 is made up of outer side walls 21a welded to 21b at weld joint 25b and the inside side 22 is made up of inner side wall 23a welded to 23b at weld joint 25e. These inner and outer side walls 23a, 23b, 21a, 21b are preferably joined by welding in a chamber filled with pressurized gas, such as Argon. The outer side wall 21a and inner side wall 23a are welded to the upper plate 27 at weld joints 25a and 25d respectively. In a similar manner, the outer side wall 21b and inner side wall 23b are welded to the lower plate 29 at weld joints 25c and 25f respectively. After the welding process, a pressurized volume of gas will be trapped in the gas chamber 24. The pressure of this gas increases with increasing operational temperatures and effectively increases the gas spring rate of the seal 18.

The seal 18 seals against the first face plate 14 at contact section 26 and against the second face plate 16 at contact section 28. This sealing function prevents the leakage of engine gases through the separation gap 15. The axial face seal assembly 10 operates in any orientation, but is shown in the drawings in a particular orientation only for convenience. The mechanical spring rate and the gas spring rate of the seal 18 can be tailored for a particular application. This can be accomplished by the proper selection of materials, the thickness of the individual components, the contours of the individual components and the initial pressure contained in the chamber 24. The sides 20, 22 can be made up of two or more walls joined together in various geometries or integrally formed as a single side.

Figure 2:
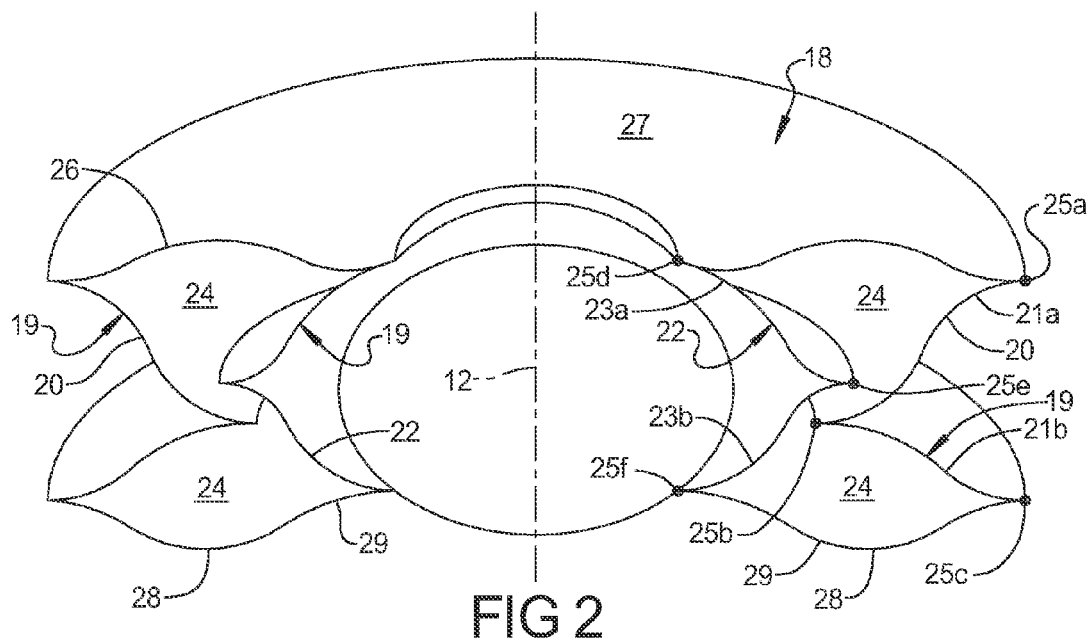
FIG. 2 is a cross-sectional perspective view of the pressurized bellows spring shown in FIG. 1.

Now referring to FIG. 2 of the drawing, a sectioned cross-sectional perspective view of the seal 18 is shown including the individual components of the bellows spring 10, such as the upper and lower plates 27, 29 and the bellows sides 20, 22. In the illustrated embodiment, the seal 18 is made up of the several components that are joined together by a process such as welding. Preferably, the welding of the high temperature metallic components is performed in a pressure chamber that is filled with an inert gas. The various components of the bellows spring 19 are preferably made of an alloy with high temperature capability such as Hastelloy or Hastelloy-X or a similar alloy known in the art.

The gas chamber 24 or volume within the bellows spring 19 is formed by separate components including the upper plate 27, the bellows sides 20, 22, and the lower plate 29 (the components). These components are relatively thin and flexible and are made of a high temperature capable alloy. The contour of each component can be tailored to minimize the internal stresses at elevated temperatures. In general, the radii of curvature in the components are maximized to also minimize stress and maximize the performance of the bellows spring 19. The bellows outside and inside sides 20, 22 includes a first outer side wall 21a and a second outer side wall 21b and a first inner side wall 23a and a second inner side wall 23b. In an embodiment, the first outer side wall 21a is welded both to the upper plate 27 at the first weld joint 25a and to the second outer side wall 21b at the second weld joint 25b. The second outer side wall 21b is welded to the lower plate 29 at the third weld joint 25c which completes the outside side 20. To form the inside side 22, the first inner side wall 23a is welded both to the upper plate 27 at the fourth weld joint 25d and to the second inner side wall 23b at the fifth weld joint 25e. The second inner side wall 23b is also welded to the lower plate 29 at the sixth weld joint 25f which completes the inside side 22. At least the final closing of the walls of the bellows spring 19 by welding is performed in a pressurized inert gas chamber. In this manner, chamber 24 of the seal 18 is charged with an inert gas, such as Argon, to minimize oxidation on the interior walls of the chamber 24. The thickness and radius of curvature of the walls 21a, 21b, 23a, 23b and the upper and lower plates 27, 29 can be varied according to the operational requirements. Even the thickness and contour of each wall can be varied along its length to minimize stress levels at various temperatures. In the alternative, the inside and outside sides 20, 22 of the bellows spring 19 can be formed to functionally include the walls 21a, 21b, 23a, 23b that are formed into the required structure and not as welded separate pieces.

As shown in FIG. 1, the seal 18 seals against the first face plate 14 at contact section 26 and against the second face plate 16 at contact section 28. This sealing function prevents the leakage of engine gases through the separation gap 15 and the axial face seal assembly 10 operates in any orientation but is shown in the drawings in a particular orientation only for convenience. The mechanical spring rate and the gas spring rate of the seal 18 can be tailored for a particular application. This can be accomplished by the proper selection of materials, the thickness of the individual components, the contours of the individual components and the initial pressure contained in the chamber 24. The sides 20, 22 can be made up of two or more walls joined together in various geometries or integrally formed as a single side.

The disclosed axial face seal could also be applied in alternative sealing configurations and orientations within a jet turbine engine or in other applications to produce similar sealing performance gains while, in some cases, also facilitating assembly during manufacture or maintenance. One of these other applications would include radial seal configurations where the increased internal pressure within the chamber 24 of the bellows spring 19 could be used to shift points of contact or seal orientation. Using the disclosed seal technology, sealing loads from the as installed condition could be changed with changes in operating temperature.

Now referring to FIG. 3 of the drawings, a cross-sectional view of one side of a first alternative embodiment of the invention is shown that includes a seal 70 of tan axial face seal assembly 80. To form the seal 70, an upper outer wall 72 is attached, usually by welding, to both an upper inner wall 76 and a lower outer wall 74 to form the outer side 68. The upper inner wall 76 is attached to the lower inner wall 78 and the lower inner wall 78 is also attached to the lower outer wall 74 to form the inner side 69. The first edge of the upper outer wall 72 is attached to a first edge of the upper inner wall 76 at first weld joint 79a. The second edge of the upper inner wall 76 is attached to a first edge of the lower inner wall 78 at third weld joint 79c. The second edge of the lower inner wall 78 is attached to a first edge of the lower outer wall 74 at second weld joint 79b. The second edge of the lower outer wall 74 is attached to the second edge of the upper outer wall 72 at fourth weld joint 79d. Each of the weld joints 79a-79d are made in a generally flat section formed in each of the walls 72, 74, 76 and 78. The first and second weld joints 79a and 79b are directed inwardly while the third and fourth weld joints 79c and 79d are directed outwardly.

The walls 72, 74, 76 and 78 are preferably made of high temperature tolerant alloy such as Hastelloy or Hastelloy-X or other suitable material that exhibits high temperature resilience when formed into final shape and contour. The walls can be formed using known techniques and processes such as stamping, coining or rolling. The gas chamber 73 within the seal 70 is sealed upon the final weld, which is preferably made in a chamber that is filled with a pressurized gas, such as Argon or another inert gas. The seal 70 presses and seals against the first and second face plates 65 and 66 at contact points 71a and 71b respectively. As the pressure of the gas in the chamber 73 increases with increasing temperature, the separation force reacting against the first and second face plates 65, 66 increases thereby maintaining the seal at contact points 71a and 71b. The walls 72, 74, 76 and 78 can be made of a material having uniform thickness or each wall can be made of a material having a customized thickness along its length to minimize stresses. Also, the curvature of each wall can be customized to minimize stress and yield the desired operating characteristics. Generally, each wall has a radius of curvature that is maximized within the constraints of the packaging requirements. Also, the outer side 68 and the inner side 69 can be made up of two or more walls welded together.

Now referring to FIG. 4 of the drawings, a full cross-sectional view of the first alternative embodiment of the sea 170 of the exemplary axial seal assembly 80 of FIG. 3 is shown. The first face plate 65 is separated from the second face plate 66 by a very narrow separation gap 77. Normally this gap 77 would allow high temperature pressurized gases to escape from the internal cavity 67 through the gap 77 to the outside. However, according to the present disclosure, the seal 70 contacts both the first and second face plates 65, 66 at contact points 71a and 71b respectively and seal the internal cavity 67 from the outside so that the leakage of gases from the internal cavity 67 is minimized. The mechanical spring rate and the gas spring rate of the seal 70 can be tailored through the design of the components of the seal 70 for a particular application. Some design parameters include the alloy selected, the contour of the walls, the pressures of the gas in the chamber 73 and the overall and individual component geometry.

Figure 5:
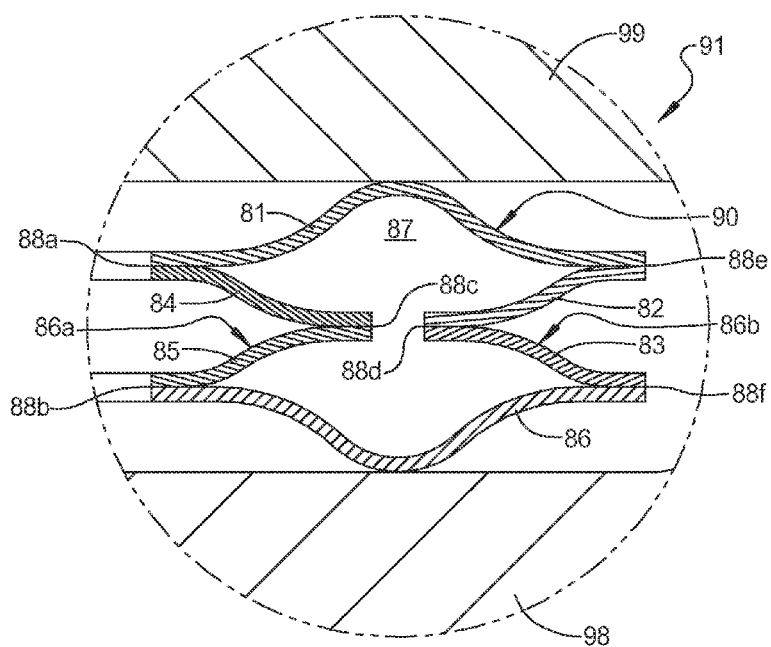
FIG. 5 is a partial cross-sectional view of one side of a second alternative embodiment of the axial face seal assembly.

Now referring to FIG. 5 of the drawings, a cross-sectional view of one side of a second alternative embodiment of a seal 90 of an exemplary axial face seal assembly 91 is shown. The seal 90 is formed by a top plate 81 that is attached at its outer (right) edge to an upper outer wall 82 and at its inner edge to an upper inner wall 84. The inner (left) edge of the upper outer wall 82 is attached to the inner edge of the lower outer wall 83 to form the outer side 86b. The outer edge of the lower outer wall 83 is attached to the outer edge of the bottom plate 86. The inner edge of the upper inner wall 84 is attached to the outer edge of the lower inner wall 85 to form the inner side 86a. The inner edge of the lower inner wall 85 is attached to the inner edge of the bottom plate 86 all of which combine to form the gas chamber 87. All attachments are made using known methods of attachment for high temperature metallic elements and preferably by welding. The attachment process is preferably performed in a chamber filled with pressurized gas, such as Argon or another inert gas.

Preferably, the top and bottom plates 81, 86 and the walls 82-85 are made of high temperature capable alloy and are attached one to the other using welding to form a resilient structure. Weld joints 88a-88f are used to join the various components to form the bellows spring portion of seal 90 that defines the gas chamber 87 and are made on localized flat sections of the walls 82-85 and plates 81, 86. The gas chamber 87 is sealed with the making of the welds of the walls 82-85, where the welding process is performed in a chamber pressurized with a gas, such as Argon or another inert gas. The first, second and fourth weld joints 88a, 88b and 88d are directed inwardly, while the third, fifth and sixth weld joints 88c, 88e and 88f are directed outwardly. The very top of the top plate 81 is positioned to press against the second face plate 99 and the very bottom of the bottom plate 86 is positioned to press against the first face plate 98. Thus, the seal 90 seals the first engine component to the second engine component. The first and second face plates 98 and 99 are typically within a jet turbine engine in the engine core sections or engine housing sections, but may be found in other applications having a sealing requirement.

Figure 6:
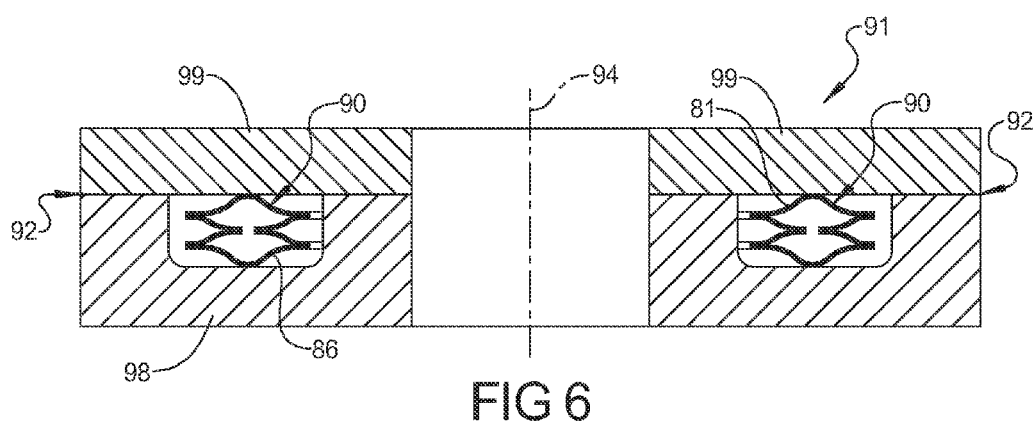
FIG. 6 is a cross-sectional view of the axial face seal assembly of FIG. 5.

Referring to FIG. 6 of the drawings, a full cross-section of the seal 90 of FIG. 5 installed between a first face plate 98 and a second face plate 99 is shown. The first face plate 98 can be considered as the first engine component and the second face plate 99 can be considered as the second engine component with respect to the discussion of FIGS. 5 and 6. At the location where the first face plate 98 contacts the second face plate 99 is a separation gap 92. It would be desirable to seal the gap 92 to prevent the passage of high temperature pressurized gas through the separation gap 92 to an exterior area. The separation gap 92 would allow gases to pass between the first and second face plates 98, 99 except for the sealing action of the bellows spring 90. The seal 90 seals at the bottom plate 86 against the first face plate 98 and at the top plate 81 of the seal 90 against the second face plate 99. Note that the axial face seal assembly 91 will operate in any orientation. The mechanical spring rate and the gas spring rate of the seal 90 can be tailored through the design of the components of the seal 90 for a particular application. Some of the design parameters include the alloy selected, the thickness of the walls, the contour of the walls, the pressures of the gas in the chamber 87 and the overall and individual component geometry.

Figure 7:
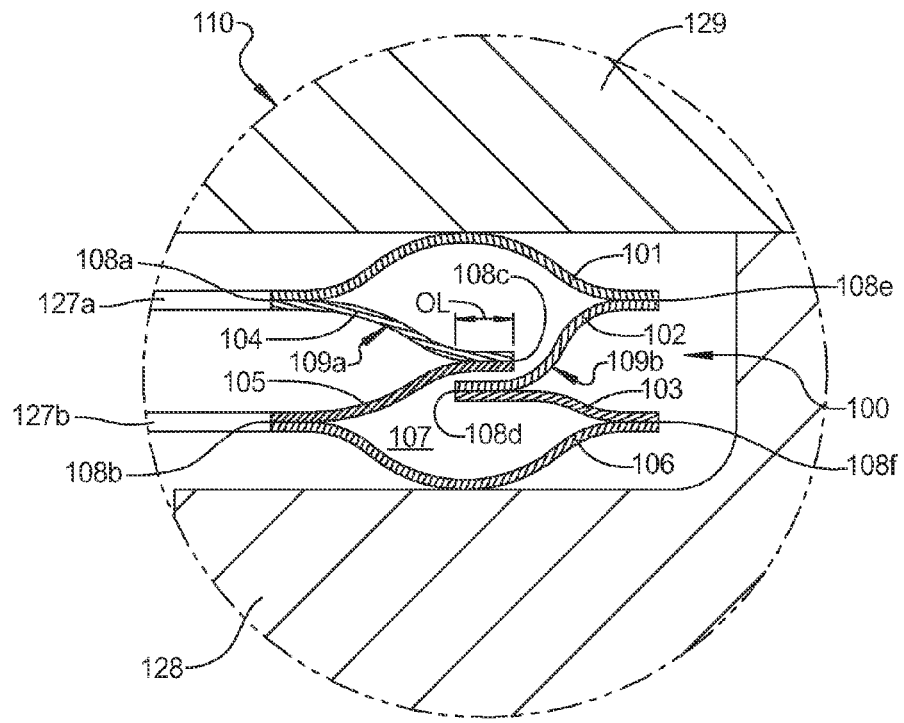
FIG. 7 is a partial cross-sectional view of one side of a third alternative embodiment of the axial face seal assembly.

Now referring to FIG. 7 of the drawings, a cross-sectional view of one side of a third alternative embodiment of a seal 100 as used in an exemplary axial face seal assembly 110 is shown. The seal 100 includes a top plate 101 which is attached at its outer edge to an upper outer wall 102 and at its inner edge to an upper inner wall 104. The inner edge of the upper outer wall 102 is joined to the inner edge of the lower outer wall 103 to form the outer side 109b. The outer (right) edge of the lower outer wall 103 is attached to the outer edge of the bottom plate 106. The inner edge of the upper inner wall 104 is attached to the outer edge of the lower inner wall 105 to form the inner side 109a. The inner (left) edge of the lower inner wall 105 is attached to the inner edge of the bottom plate 106. Note that in this embodiment, the inner edges of the upper outer wall 102 joined to the lower outer wall 103 overlap the outer edges of the upper inner wall 104 joined to the lower inner wall 105 by an overlap distance labeled as "OL". Weld joints 108a-108f hold the walls 102-105 and the top and bottom plates 101, 106 respectively together. First weld joint 108a is used to attach the top plate 101 to the upper inner wall 104. Second weld joint 108b is used to attach the bottom plate 106 to the lower inner wall 105. Third weld joint 108c is used to attach the upper inner wall 104 to the lower inner wall 105. Fourth weld joint 108d is used to attach the upper outer wall 102 to the lower outer wall 103. Fifth weld joint 108e is used to attach the top plate 101 to the upper outer wall 102. Six weld joint 108f is used to attach the lower outer wall 103 to the bottom plate 106. The amount of overlap distance OL can be varied depending on the overall geometry of the seal 100, the material used, the thickness and contour of the walls 102-105 and thickness and contour of the top and bottom plates 101, 106 and the operating parameters. Inert gas trapped in the gas chamber 107 increases in pressure with increasing temperature thereby increasing the gas spring force of the seal 100. The seal 100 is resilient and provides both a mechanical spring force and a gas spring force. The weld joints 108a-108f are in the same orientation as comparable weld joints in FIGS. 5&6 but, in this FIG. 7, the third and fourth weld joints 108c and 108d overlap by an overlap distance OL. This makes the seal 100 more compact and changes the operating characteristics of the mechanical and gas spring rates.

Figure 8:
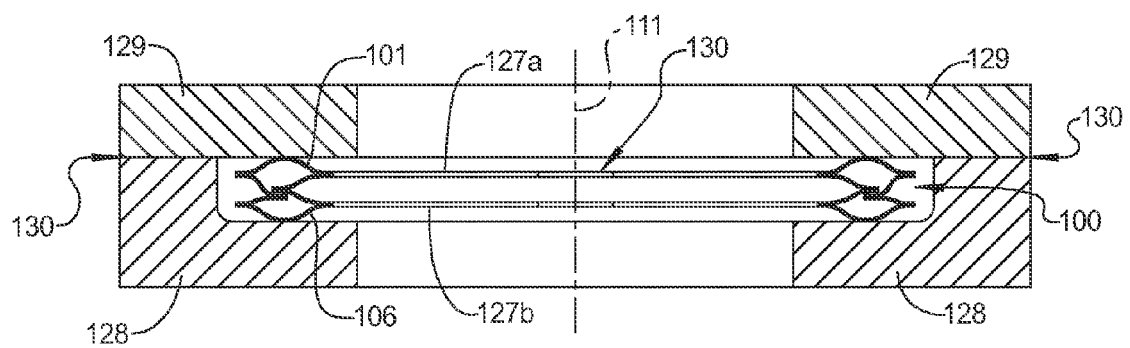
FIG. 8 is a cross-sectional view of the axial face seal assembly shown in FIG. 7.

Now referring to FIG. 8 of the drawings, a full cross-section of the seal 100 of FIG. 7 installed between a first face plate 128 and a second face plate 129 is shown. The first face plate 128 can be considered as the first engine component and the second face plate 129 can be considered as the second engine component with respect to the discussion of FIGS. 7 and 8. The seal 100 seals between, for example, the first and second engine components by creating a separation force on the first and second face plates 128, 129. Where the first face plate 128 contacts the second face plate 129 is a separation gap 130 that would, without the seal 100, allow pressurized gases to pass between the first and second face plates 128, 129. The sealing action of the seal 100 prevents the passage of gas through the separation gap 130 even at high temperatures where the sealing ability of prior art seals would be compromised. The seal 100 seals at the bottom plate 106 against the first face plate 128 and at the top plate 101 against the second face plate 129. The pressurized gas within the gas chamber 107 creates a sealing force on the face plates 128 and 129 that increases with increasing temperature depending on the amount of reduction in the mechanical spring force exerted by the seal 100. The seal 100 is shown having a first disc 127*a* that connects the inside edges of the top plate 101 and of the upper inner wall 104 together to form a larger circular disc. Second disc 127*b* connects the inside edges of the lower plate 106 and the lower inner wall 105 to form a larger disc. An aperture is shown in the first face plate 128 and the second face plate 129 and in the circular discs 127*a*, 127*b* around the axis of rotation 111 that allows for the insertion of an engine shaft that rotates relative to the face plates 128, 129. Note that the axial face seal assembly 110 will operate in any orientation. The mechanical spring rate and the gas spring rate of the seal 100 can be tailored through the design of the components of the seal 100 for a particular application. Some of the design parameters include the alloy selected, the contour of the walls, the pressures of the gas in the chamber 107 and the overall and individual component geometry.

Figure 9:
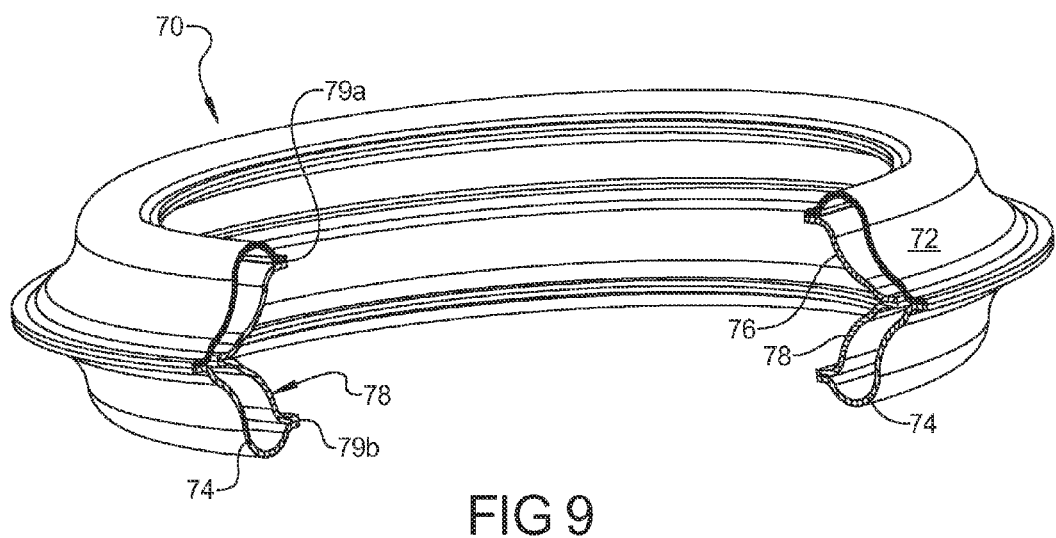
FIG. 9 is a sectioned perspective view of the axial face seal bellows spring as shown in FIGS. 3 & 4.
Figure 10:
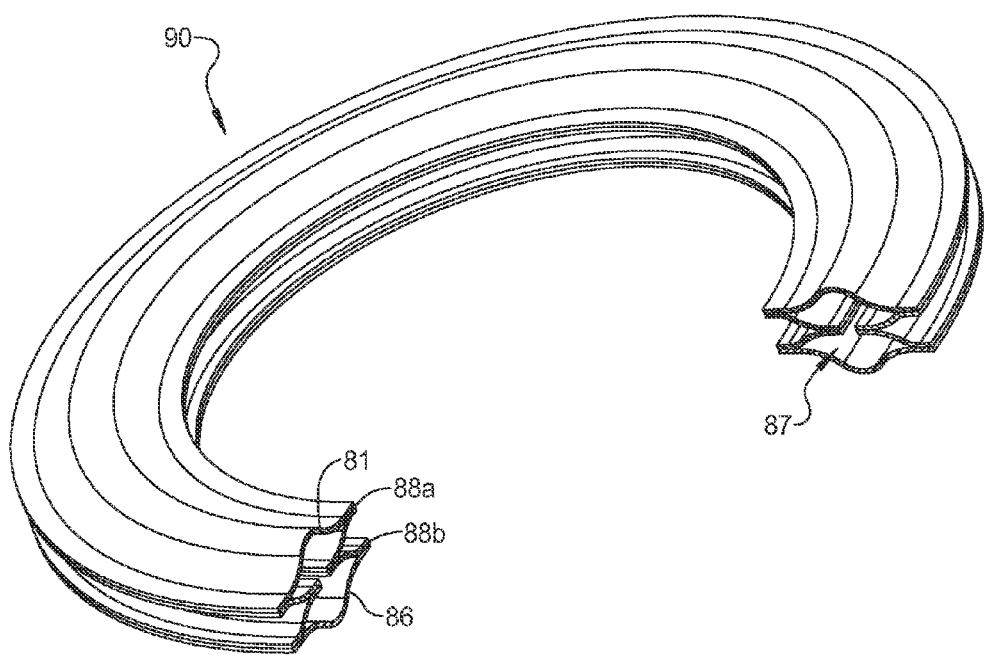
FIG. 10 is a sectioned perspective view of the axial face seal bellows spring shown in FIGS. 5 & 6.

Now referring to FIG. 9, a sectioned perspective view of the seal 70 of FIGS. 3 & 4 is shown. More clearly shown is the general ring like shape of the seal 70. Now referring to FIG. 10, a sectioned perspective view of the seal 90 of FIGS. 5 & 6 is shown. Again, clearly shown is the general ring like shape of the seal 90.

Figure 11:
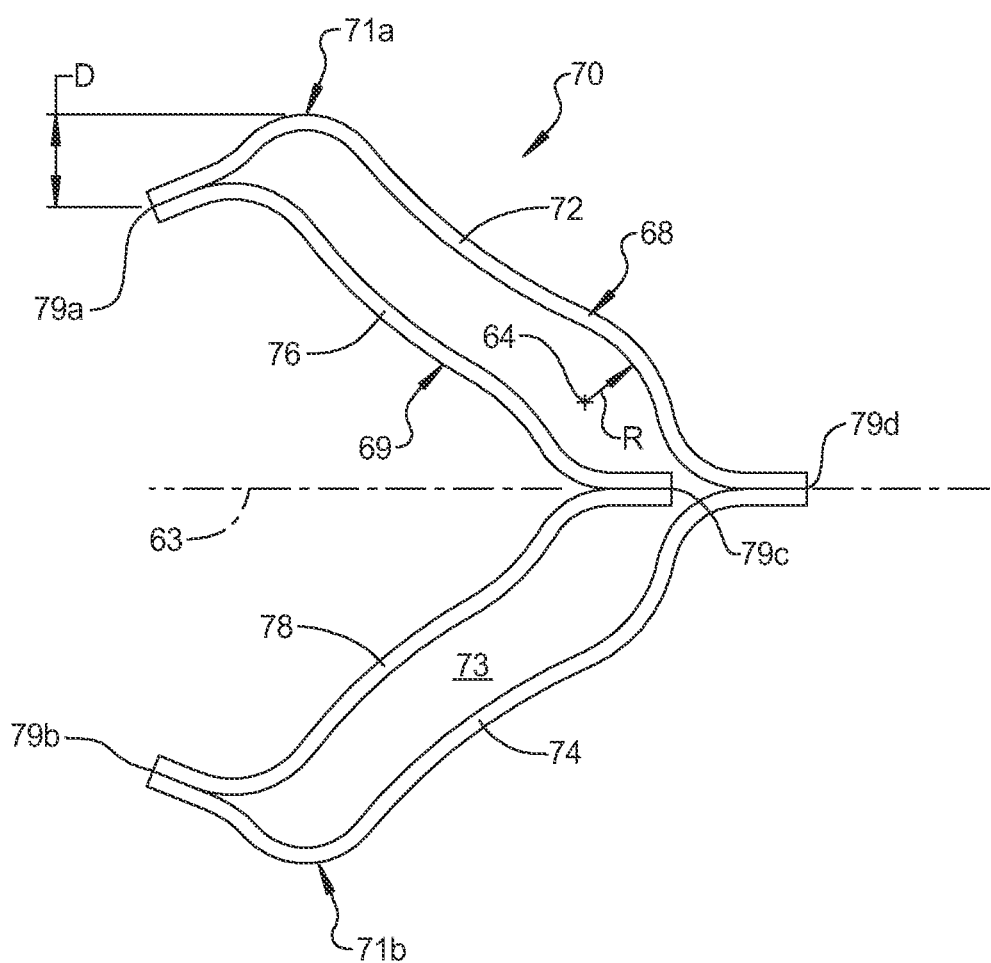
FIG. 11 is a cross-sectional view of the bellows spring shown in FIGS. 3 & 4 showing certain design features.

Now referring to FIG. 11 of the drawings, a cross-sectional view of the seal 70 of FIGS. 3 and 4 is shown with additional dimensional and structural details. The structure of the seal 70 is formed by an upper outer wall 72 which is attached, usually by welding, to both an upper inner wall 76 and a lower outer wall 74 to form the outer side 68. The upper inner wall 76 is attached to the lower inner wall 78 and the lower inner wall 78 is also attached to the lower outer wall 74 to form the inner side 69. The first edge of the upper outer wall 72 is attached to a first edge of the upper inner wall 76 at first weld joint 79*a*. The second edge of the upper inner wall 76 is attached to a first edge of the lower inner wall 78 at third weld joint 79*c*. The second edge of the lower inner wall 78 is attached to a first edge of the lower outer wall 74 at second weld joint 79*b*. The second edge of the lower outer wall 74 is attached to the second edge of the upper outer wall 72 at fourth weld joint 79*d*. Each of the weld joints 79*a*-79*d* is made on localized flat sections of the respective walls 72, 74, 76, and 78.

In an embodiment of the invention, the seal 70 would require the final or closing weld to be performed in an inert gas, pressurized chamber. The seal 70 would be charged with an inert gas to minimize oxidation on the interior of the bellows spring portion of the seal 70 in the bellows chamber 73 and to provide the proper initial operating pressure inside of the chamber 73. The operational advantage of the exemplary seal 70 is the decoupling of the sealing force generated from the mechanical properties of the bellows spring by including a gas spring to provide resilience at temperatures above the capabilities of most alloys commonly used for metallic axial face seals.

Reduction of the thickness of any of the disclosed bellows walls 72, 74, 76, 78 (structural members) while maintaining symmetry about a horizontal axis centerline 63 that splits the axial envelope of the bellows spring 70 into two equal halves, will improve the ability of the seal 70 to track cavity axial motions (between the engine components) to reduce stresses in the bellows spring portion of the seal 70 due to deflection and bending of the structural members. Generally, the structural members should be designed with sections that have a radius that is maximized while minimizing the cross-sectional envelope of the seal 70. For each wall 72, 74, 76, 78, these radii can consist of a first radius that is directed in a first direction and a second radius directed in a second direction. Additional radii can be added for each wall depending on the gas and mechanical spring requirements and the internal stress levels. Increasing the radius of the sections, such as radius R in FIG. 12, serves to improve the deflection capabilities of each structural member of the seal 70. In general, the radii should be maximized and there should be gentle transitions between the various radii of the structural members of the seal 70. If these radii are too sharp, the deflections of the seal 70 will cause one of the structural members to yield plastically significantly more than the other structural members. In addition, with larger radii, the structural members are more likely to share loading and deflection.

Each wall can have a cross-sectional thickness that is relatively constant or it can be contoured with varying thickness through a mechanical forming step such as coining. The various dimensions, thicknesses, alloys chosen, internal pressure, etc., can all be varied to tailor the design to specific operating parameters dictated by a target application. With this design, the spring properties of the seal assembly are decoupled from the mechanical spring properties in the sense that at a given operating condition there is a required sealing force by the bellows or other sealing device but due to stress relaxation in the metallic material, the mechanical force decreases over the life of the seal and this deficiency is made up by the gas spring aspect of the seal and the axial seal of the present application exhibits a long operational life while generating the required sealing force. Thus, according to the present disclosure, a resilient seal that uses a mechanical spring and a gas spring can be used to supply a required sealing force over a wide range of operational conditions.

It is generally desirable for most applications that the distance D from the point of sealing at the contact point 71*a* and the weld 79*a* on the seal 70 should be minimized to improve the ability of the seal 70 to track any axial changes between the engine components (see also FIG. 4). Note that the weld 79*b* should be positioned in a similar manner to optimize the performance of the seal 70. Also, to further improve the ability of the seal 70 to track changes in the vertical distance between the engine components, the radius R of the initial bend after the centerline 63 of the seal 70 should have a center point 64 that is offset from the centerline 63. The result would be a reduction in the stresses induced in the seal 70.

Note that the walls 72, 74, 76 and 78 of the seal 70 are formed into flat sections in the vicinity of the weld joints 79*a*-79*d* and then followed by alternating sections of the wall where the shape of the wall section changes between a convex and concave radii of curvature to contour the walls. The length of the flat section in the vicinity of the weld joints 79*a*-79*d* should be minimized to improve the deflection capabilities of the seal 70 and to minimize the stresses induced in the seal 70 as the separation distance between the engine components that are being sealed changes with changing operating conditions. The operational advantage of the exemplary seal 70 is the decoupling of the sealing force generated from the mechanical properties alone of the seal 70 to provide resilience at temperatures above the capabilities of most alloys commonly used for metallic seals.

Sealing performance of resilient metallic seals is highly dependent upon spring force which is based on form factors and the chosen alloys properties with respect to strength and stress relaxation behaviors. Typical resilient metallic seals lose resilience as the combination of deflection and pressure induced stresses exceed the strength limits of the metals at elevated temperatures. Extremely elevated temperatures (e.g., above 1200 deg. F.) complicate matters as alloys with high stress limits at lower temperatures suffer from excessive stress relaxation while alloys with good oxidation resistance and minimal percentage stress loses at temperature begin with far lower allowable stress limits. It would be desirable to decouple to the greatest extent possible the seal's resilience or ability to track cavity movements from the mechanical strength properties of the alloy and thereby allow the use of alloys with good refractory properties. The mechanical flexibility of the seal assembly could be greater than normal for a high pressure application by virtue of the internal pressurization and the effect of lower differential pressure. The pressure based gas spring supplements the metallic properties of the seal thereby allowing for thinner seal materials and resultant lower operating stress levels across the seal both at low and high operational temperatures. The exemplary seal assembly would benefit from the final or closing weld to be performed in an inert gas pressure chamber to charge the chamber volume and to minimize oxidation on the interior of the bellows components, both during welding and in operation. It will be appreciated that other techniques for joining the bellows components may also be employed, including, without limitation, brazing the bellows components.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

We claim:

1. A seal, comprising:
    a bellows spring including a plurality of walls that define a chamber having a volume containing a pressurized gas, said bellows spring comprising a mechanical spring and said pressurized gas comprising a gas spring, wherein a sealing force generated by the seal at a target operating condition includes the gas spring that compensates for a deficiency of the mechanical spring associated with a stress relaxation in a material of the bellows spring;
    wherein said plurality of walls includes a top plate, an upper outer wall attached to an outer edge of said top plate, an upper inner wall attached to an inner edge of said top plate, a bottom plate, a lower outer wall attached to an outer edge of said bottom plate, and a lower inner wall attached to an inner edge of said bottom plate;
    wherein said upper inner wall is attached to said lower inner wall at an inner connection point to form an inner side; wherein said upper outer wall is attached to said lower outer wall at an outer connection point to form an outer side;
    wherein said inner connection point is axially offset from said outer connection point; and
    wherein said inner side is asymmetrical to said outer side with respect to an axial axis of the seal.

2. The seal of claim 1, wherein said inner side and said outer side are overlapping.

3. The seal of claim 1, wherein at least one of said walls has a side radius directed in a first direction and a second side radius directed in a second direction offset from said first direction.

4. The seal of claim 1, wherein said outer side is indirectly connected to said inner side by said top plate and said bottom plate.

5. The seal of claim 1, wherein said bottom plate contacts a first face plate at a first contact point and said top plates contacts a second face plate at a second contact point.

6. The seal of claim 1, wherein a portion of said upper outer wall attached to said lower outer wall overlaps a portion of said upper inner wall attached to said lower inner wall.

7. The seal of claim 1, wherein at least one of said walls has one section with a convex radius of curvature and an adjacent section with a concave radius of curvature.

8. The seal of claim 1, wherein said outer side and said inner side overlap each other in an axial direction.

9. A seal assembly, comprising:
    a first face place;
    a second face plate adjacent to said first face plate forming a separation gap therebetween; and
    a bellows spring positioned between said first and second face plates to provide a seal therebetween at a target operating condition, the bellows spring including a plurality of walls that define a chamber having a volume containing a pressurized gas, said bellows spring comprising a mechanical spring and said pressurized gas comprising a gas spring, wherein a sealing force generated by the seal at a target operating condition includes the gas spring that compensates for a deficiency of the mechanical spring associated with a stress relaxation in a material of the walls;
    wherein said plurality of walls includes a top plate, an upper outer wall attached to an outer edge of said top plate, an upper inner wall attached to an inner edge of said top plate, a bottom plate, a lower outer wall attached to an outer edge of said bottom plate, and a lower inner wall attached to an inner edge of said bottom plate;
    wherein said upper inner wall is attached to said lower inner wall at an inner connection point to form an inner side; wherein said upper outer wall is attached to said lower outer wall at an outer connection point to form an outer side;
    wherein said inner connection point is axially offset from said outer connection point; and
    wherein said inner side is asymmetrical to said outer side with respect to an axial axis of the seal.

10. The seal assembly of claim 9, wherein said inner side and said outer side are overlapping.

11. The seal of claim 9, wherein at least one of said walls has a contoured cross-section.

12. The seal assembly of claim 9, wherein said bellows spring is compressed between said first and second face plates thereby providing a gas seal therebetween.

13. The seal assembly of claim 12, wherein said outer side is indirectly connected to said inner side by said top plate and said bottom plate.

14. The seal assembly of claim 9, wherein a portion of said upper outer wall attached to said lower outer wall overlaps a portion of said upper inner wall attached to said lower inner wall.

15. The seal assembly of claim 9, wherein said bottom plate contacts said first face plate at a first contact point and said top plate contacts said second face plate at a second contact point.

16. The seal assembly of claim 9, wherein said outer side and said inner side overlap each other in an axial direction.

\* \* \* \* \*